United States Patent
Strasser

(10) Patent No.: US 11,904,725 B2
(45) Date of Patent: Feb. 20, 2024

(54) METHOD FOR ASCERTAINING A VARIABLE WHICH RELATES TO THE STATE OF A MOTOR VEHICLE BATTERY, COUNTER DEVICE, AND MOTOR VEHICLE

(71) Applicant: AUDI AG, Ingolstadt (DE)

(72) Inventor: Roman Strasser, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 352 days.

(21) Appl. No.: 17/045,581

(22) PCT Filed: Mar. 18, 2019

(86) PCT No.: PCT/EP2019/056708
§ 371 (c)(1),
(2) Date: Oct. 6, 2020

(87) PCT Pub. No.: WO2019/206518
PCT Pub. Date: Oct. 31, 2019

(65) Prior Publication Data
US 2021/0023962 A1     Jan. 28, 2021

(30) Foreign Application Priority Data
Apr. 25, 2018   (DE) ..................... 10 2018 206 414.8

(51) Int. Cl.
*B60L 58/16*   (2019.01)
*H04W 4/46*   (2018.01)
*B60L 58/12*   (2019.01)

(52) U.S. Cl.
CPC ............ *B60L 58/16* (2019.02); *B60L 58/12* (2019.02); *H04W 4/46* (2018.02)

(58) Field of Classification Search
None
See application file for complete search history.

(56) References Cited

U.S. PATENT DOCUMENTS

| | | | |
|---|---|---|---|
| 6,727,708 B1 | 4/2004 | Dougherty et al. | |
| 2004/0189257 A1* | 9/2004 | Dougherty ........ | H01M 10/4257 320/132 |

(Continued)

FOREIGN PATENT DOCUMENTS

| | | |
|---|---|---|
| CN | 104272328 A | 1/2015 |
| CN | 104459552 A | 3/2015 |

(Continued)

OTHER PUBLICATIONS

Examination Report dated Feb. 11, 2019 in corresponding German application No. 10 2018 206 414.8; 18 pages including Machine-generated English-language translation.

(Continued)

*Primary Examiner* — Nasima Monsur
(74) *Attorney, Agent, or Firm* — Maier & Maier, PLLC

(57) ABSTRACT

A method for ascertaining a variable which relates to the state of a motor vehicle battery of a first motor vehicle and which indicates a count value in order to count a previously effective service life of the motor vehicle battery, and wherein a starting count value is provided in order to ascertain the count value and at least one parameter which influences the effective service life of the motor vehicle battery is detected. An estimated value for the influence of the at least one detected parameter on the effective service life of the motor vehicle battery is calculated on the basis of the at least one detected parameter, and the starting count value is increased to a current count value on the basis of the calculated estimated value.

8 Claims, 2 Drawing Sheets

(56) References Cited

U.S. PATENT DOCUMENTS

| | | | | |
|---|---|---|---|---|
| 2009/0027056 A1* | 1/2009 | Huang | ................ | G01R 31/392 |
| | | | | 320/132 |
| 2013/0085696 A1 | 4/2013 | Xu et al. | | |
| 2013/0262067 A1* | 10/2013 | Zhang | ................ | G05B 23/024 |
| | | | | 703/8 |
| 2014/0266227 A1* | 9/2014 | Harman | ............... | G01R 31/382 |
| | | | | 324/426 |
| 2018/0050601 A1 | 2/2018 | Katanoda | | |

FOREIGN PATENT DOCUMENTS

| | | |
|---|---|---|
| CN | 106353691 A | 1/2017 |
| DE | 198 49 163 | 4/2000 |
| DE | 10 2004 004 280 A1 | 8/2005 |
| DE | 10 2016 206 802 A1 | 10/2017 |
| DE | 10 2016 209 884 A1 | 12/2017 |
| EP | 1 941 289 B1 | 7/2008 |

OTHER PUBLICATIONS

International Search Report dated Jun. 13, 2019 in corresponding International application No. PCT/EP2019/056708; 6 pages.
Written Opinion of the International Searching Authority dated Jun. 13, 2019 in corresponding International application No. PCT/EP2019/056708; 10 pages including Machine-generated English-language translation.
Notification of Transmittal of Translation of the International Preliminary Report on Patentability dated Nov. 5, 2020, in connection with corresponding international application No. PCT/EP2019/056708 (7 pages).
Office Action dated Feb. 28, 2023, in corresponding Chinese Application No. 201980027616.9, 22 pages.

* cited by examiner

METHOD FOR ASCERTAINING A VARIABLE WHICH RELATES TO THE STATE OF A MOTOR VEHICLE BATTERY, COUNTER DEVICE, AND MOTOR VEHICLE

FIELD

The disclosure relates to a method for ascertaining a variable which relates to a state of a motor vehicle battery of a motor vehicle. The disclosure also relates to a counter device as well as a motor vehicle.

BACKGROUND

In motor vehicles, odometers are normally used for mileage and thus also as an indicator of the use and/or wear of the motor vehicle. In agricultural or construction machinery, this takes place in a similar manner using an operating hour counter. With the technology shift in the automotive industry and the transition to battery-operated and/or electrified vehicles, the two aforementioned measuring systems lose their significance, because, on the one hand, the electric motors are normally maintenance-free and also are subject to much less wear than combustion engines.

On the other hand, the "wearing part" and/or the part determining or limiting the service life in electrified motor vehicles is the battery, or more precisely the high-voltage battery. The service life of the battery greatly depends, in turn, on the most varied of parameters such as, for example, the state of charge, temperatures, or the like. In order to inform a user of the current state of such a motor vehicle battery, methods are known in which a remaining service life and/or remaining lifetime of the battery is estimated primarily based on the state data of the battery, as is described, for example, in DE 10 2016 206 802 A1, DE 10 2016 209 884 A1, and DE 10 2004 004 280 A1. Such an estimated remaining service life can then be displayed, for example, on a mobile communication device of the user.

However, the indication of the remaining service life is likewise disadvantageously not particularly significant for describing a state of the battery. This is contingent on several factors. On the one hand, an assumption must be made regarding the total service life of such a battery. However, because high-voltage battery technology is still relatively new, such assumptions cannot currently be based on empirical values. Thus, estimates must be determined for this which are normally very conservative, in all probability, to the extent that the actual service life of a battery exceeds such an estimated total service life. Furthermore, the actual end of life of a battery is also very subjective. The capacity of a battery is reduced over time such that the range to be achieved with a battery charge becomes increasingly reduced, and the battery must be correspondingly charged with increasing frequency. However, the determination as to when this exceeds an unacceptable level, which then correspondingly defines the end of the service life, is subjective. A further problem is that battery variables such as, for example, the current capacity, only represent the current actual state of the battery, which normally does not provide any significance regarding a future development. Even if the chronological development of such capacity is considered, this hardly provides any significance regarding the future development or the remaining service life, because, in this case, linear relationships normally cannot be presumed. For example, if the capacity of a battery is only slightly reduced in the first years, it cannot necessarily be presumed that the battery still has a very long remaining lifetime available. At the end of the lifetime, for example, the capacity of a relatively high value can become greatly reduced in a very short time. Thus, making a prediction of the remaining lifetime on the basis of such actual state variables of the battery is therefore very imprecise and has little significance. A further difficulty is that certain events which reduce the state of health of a battery do not show their effects immediately after they occur; rather, these effects are sometimes only shown after a very long time. For example, similar to how the effects of smoking on the state of health of a smoker can only be determined after a longer period of time, the influence of executing a quick-charge process of a battery cannot be ascertained immediately after completion of this charging process but instead is noticeable years later. Thus, the indication of a remaining service life of the battery is based on innumerable estimates and assumptions to the extent that such an indication barely has any sort of significance for a user.

SUMMARY

Therefore, the object of the present invention is to provide a method for ascertaining a variable related to a state of a motor vehicle battery of a motor vehicle, a counter device, and a motor vehicle, which are better-suited for describing the state of a motor vehicle battery.

This object is achieved by means of a method for ascertaining a variable related to a state of a motor vehicle battery of a motor vehicle, by means of a counter device, and by means of a motor vehicle having the features according to the disclosure. Advantageous embodiments of the invention are the subject matter of the disclosure.

In a method for ascertaining a variable which relates to the state of a motor vehicle battery of a first motor vehicle, the variable related to the state represents a count value in order to count a previously effective service life of the motor vehicle battery, wherein a starting count value is provided in order to ascertain the count value, at least one parameter which influences the effective service life of the motor vehicle battery is detected, an estimated value for the influence of the at least one detected parameter on the effective service life of the motor vehicle battery is calculated on the basis of the at least one detected parameter, and the starting count value is increased to a current count value on the basis of the calculated estimated value.

Similar to an odometer, the invention advantageously enables the provision of a count value which reflects the previous effective service life of the motor vehicle battery, and thus the degree of wear and/or the state of health of the battery. Thus, the previous effective service life should not be understood as the actual service life of the battery as a time span starting from its commissioning, but rather a numerical value which indicates and/or counts how many charges the battery has already undergone. Thus, the starting count value can therefore represent zero, for example, upon commissioning of the battery and be correspondingly increased with each occurring charge of the battery and/or with occurring events which lead to a certain impact on the battery immediately or even after a longer period of time. The more or the stronger charges a battery is thus subjected to over the course of time, the greater the increments or the quicker the counter counts up. The counter scale has no upper limit, as is also the case, for example, with odometers. Thus, there is no estimate regarding a remaining service life or the like provided in this case. Such a count value thus reflects the current state of a battery significantly more objectively. Such a count value thus also enables a significantly more objective comparison between various batteries. This is particularly essential, for example, when selling or buying a used vehicle. Thus, the invention enables the provision of a count value which provides a significantly more meaningful and more objective indicator of the use and/or the wear or the state of health, i.e. the previous effective service life of the motor vehicle battery.

Preferably, the at least one parameter influencing the effective service life of the motor vehicle battery is detected repeatedly and the estimated value is ascertained repeatedly on the basis of the detected parameter, wherein the current count value up to that point is increased to a new current count value, on the basis of the respectively currently determined estimated value, after each determination of the estimated value. Moreover, not just one single parameter but also several parameters influencing the effective service life of the motor vehicle battery can be detected and used to determine the described estimated value. Due to the parameters, thus various influencing variables which impact the wear and/or the state of health of the motor vehicle battery are considered, wherein the degree of this influence is quantified by the estimated value. The stronger the battery is thus probably or likely or approximately impacted by such an influencing variable, which is determined via the detected parameter, the greater the estimated value and the more the current count value is increased to a new current count value. The motor vehicle can thus collect and store, for example, all potential data impacting the motor vehicle battery, and then calculate the estimated value, at repeated intervals or even event-triggered, on the basis of this detected data and thus increase the count value. However, these calculations do not necessarily have to take place in the vehicle itself but instead can be obtained, for example, externally, for example transferred from a central data processing device or an internet server or backend server, or an infrastructure component.

In general, the data and/or parameters collected by the motor vehicle and influencing the effective service life of the motor vehicle battery can thus also be transferred to a device outside of the motor vehicle which evaluates these data and ascertains the estimated value based on said data. This estimated value can then be transferred to the motor vehicle, which then increases correspondingly the current value to the new current value according to the ascertained estimated value.

It is especially advantageous in this case when the starting count value and the current count value, as well as particularly each new current count value, are displayed in time sequence on a display device of the first motor vehicle. A counter is thus thereby provided in the motor vehicle which can always display the currently valid count value. The respectively current count value in this case does not have to be continually displayed but can also be displayed only when needed, for example due to an action of the user. It is especially advantageous in this case that the respectively current count value is displayed on a display device of the motor vehicle and is thus directly coupled to the motor vehicle itself. This provides significantly greater tampering protection as compared to, for example, the count value only being displayed on a smart phone or another mobile communication device. This is especially therefore relevant, because the count value, and generally the current state of health of the battery which is represented by the count value, significantly influences the value of an electrified motor vehicle, the same as the current mileage significantly impacts the value of conventional, non-electrified motor vehicles.

In an advantageous embodiment of the invention, the at least one parameter represents at least one of the following: a temperature, particularly an ambient temperature and/or a motor vehicle battery temperature, an execution of a charging process in which the motor vehicle battery is charged, a property of a charging process, particularly a charging capacity and/or charging period, a current state of charge of the motor vehicle battery, an operating state of the first motor vehicle, particularly whether the first motor vehicle is in the standby state or an active state, and/or a property of an operating state of the first motor vehicle, particularly a current capacity demand placed on the motor vehicle battery. The consideration of these parameters is particularly advantageous in the determination of the estimated value, because specifically these parameters greatly influence the service life of the motor vehicle battery. In order to thus calculate the estimated value which estimates the previous effective service life of the battery, environmental conditions can be considered, such as ambient temperature, temperature of the motor vehicle battery, or other component temperatures, the operation of the battery as such, i.e. the load spectrum thereof for example, the charging processes thereof, and properties of such charging processes, such as capacity and duration, the state of charge (SOC), etc. In the future, discharging processes will be added to the charging processes, due to the bidirectional charging, which further likewise influence the service life and/or the effective service life and/or the state of health of the battery and thus are likewise considered as further parameters. Longer periods of time when the motor vehicle is not in use and/or a longer period of inactivity of the battery, particularly with a fully discharged or fully charged battery, also has disadvantageous effects on the service life, which can thus also be considered another parameter. These aforementioned events and variables can be detected and documented repeatedly or continually such as, for example, the temperature and the state of charge of the motor vehicle battery, as well as the capacity demand on the battery, which is significantly determined by the manner of driving, e.g. sporty or cautiously. However, the events can also be detected and documented upon the occurrence thereof such as, for example, charging processes and thus related parameters such as duration and charging capacity. These influencing variables and influencing events can be stored, and the estimated value can be ascertained, for example, at regular time intervals on the basis of the data collected. Alternatively or additionally, the estimated value can also be updated directly after the occurrence of certain events such as, for example, after charging of the battery. On the basis of these parameters, a comprehensive description of the state of health and thus of the previous effective service life is possible.

In a further especially advantageous embodiment of the invention, the calculation of the estimated value takes place on the basis of the at least one parameter according to a rule, which is updated on the basis of at least one piece of update information which is assigned to the first motor vehicle. The rule, according to which the estimated value is calculated, may be a mathematical formula, a tabular assignment, a mathematical model, a characteristic curve, a mathematical algorithm, or the like. This rule can be based on previously obtained knowledge, particularly knowledge as to the manner in which the aforementioned parameters influence the state of health of the battery. Alternatively or additionally, for example when there is not yet sufficient knowledge regarding an influencing variable, corresponding estimates of this rule can be established. As previously described, the effects of some events or influencing variables on the health of the battery are not immediately apparent but instead are only seen, for example, after a longer period of time. Specifically with such influencing factors, there is often not enough knowledge to precisely describe this influence. Thus, it is especially advantageous, as is provided according to this exemplary embodiment of the invention, that the rule can be updated on the basis of a piece of update information. For example, if new knowledge is obtained, the rule, according to which the estimated value is determined, can also be advantageously updated and adapted to the new findings. For example, if it is determined over the course of time that quick-charge processes are not impacting the state of health of the battery as strongly as assumed at the start, the rule can also correspondingly be adapted in that the negative influence of such a quick-charge process is given less weighting as the at least one parameter in the calculation of the estimated value. It can also be determined, for example, over the course of time that there are other significant influencing factors impacting the effect of service life of the battery which have not even been mentioned, for example, in the listing of the above parameters. This can then also be advantageously considered in the updating of the rule which is then updated, for example, such that then further parameters additionally influencing the service life of the battery are considered in the rule, which can then likewise be detected additionally by the motor vehicle. Thus, the calculation of the estimated value and thus the method of counting of the service life counter can advantageously then be updated over the course of time and adapted to newly obtained findings.

It is further advantageous in this case when the update information is provided by a device, which is different from the first motor vehicle, particularly is essentially different from a motor vehicle, particularly a central data processing device, an internet server, a backend server, or a communicative infrastructure device, for example a charging station, or combinations thereof. This can also represent the particular device which can also optionally take over the calculation of the estimated value as previously mentioned. Thus, if this device is also provided for calculating the estimated value, this device can thusly regularly update the rule for calculating the estimated value according to the update information assigned to the motor vehicle such that the calculation of the estimated value, which is then subsequently transferred to the first motor vehicle, is always based on the latest information. If the calculation of the estimated value is implemented by the motor vehicle itself, this device external to the vehicle can regularly transmit the update information, or optionally triggered by an event, e.g. upon a request from the first motor vehicle, to said first motor vehicle, which then accordingly updates the calculation rule.

In a further advantageous embodiment of the invention, at least one second motor vehicle with a second motor vehicle battery transfers data related to the second motor vehicle battery to the device, wherein the device evaluates the data and provides the update information assigned to the first motor vehicle on the basis of the evaluated data. Thus, the knowledge obtained from other motor vehicles can be advantageously used collectively in order to provide the update information. These data collected by the other second motor vehicles can likewise represent the aforementioned parameters which influence the effective service life of the motor vehicle battery as well as other variables, for example battery state variables, e.g. the battery capacity. It is additionally advantageous in this case when these data are additionally selected according to battery type, because the previously described parameters can also affect different battery types in different ways, e.g. batteries of different manufacturers and/or with different cell chemistry, or the like. Thus, the data obtained from other motor vehicles can be used in order to make the calculation of the estimated value for the first motor vehicle even more relevant. Thus, a type of forecast can thus advantageously then be additionally created for the first vehicle, for example for the state of health of the first motor vehicle battery in the future, or also in order to represent the future effects of currently detected influencing variables in a more relevant manner based on the estimated value using the vehicles already on the market with corresponding motor vehicle batteries and the states of health thereof and/or the counter statuses thereof. The first motor vehicle can thus also transfer the at least one parameter to this external device according to the vehicle's obtained data, and said device can then provide update information based thereupon for other motor vehicles.

Accordingly, it is a further advantageous embodiment of the invention when the first motor vehicle transfers data related to the motor vehicle battery of the first motor vehicle to the device, wherein the device evaluates the data and provides a piece of update information assigned to a third motor vehicle on the basis of the evaluated data, on the basis of which a second rule is updated, according to which a second count value is calculated for the influence of at least one second parameter on the effective service life of a third motor vehicle battery of the third motor vehicle. State data of the respective batteries, as well as, for example, also the respective counter states, and the variables influencing the effective service life of a battery, i.e. the detected parameters, can also be transferred from the existing vehicles to a server, for example, wirelessly or wired via radio communication, for example during charging at a charging point. These data are evaluated there and a characteristic piece of update information or a characteristic forecast is calculated for each individual vehicle. Thus, the rule, according to which the estimated value is calculated, regarding the number of vehicles and the operation thereof is continually improved and can thus, in turn, improve the calculation of the corresponding count value.

Furthermore, the invention also relates to a counter device for counting a previous effective service life of a motor vehicle battery of a motor vehicle, wherein the counter device is configured to provide a starting count value, on the basis of at least one detected parameter influencing the effective service life of the motor vehicle battery, to calculate an estimated value for the influence of the at least one detected parameter on the effective service life of the motor vehicle battery, and to increase the starting count value to a current count value on the basis of the calculated estimated value.

The advantages listed for the method according to the invention and its embodiments apply in a similar manner to the counter device according to the invention. Moreover, the method steps described in connection with the method according to the invention and its embodiments enable the further development of the counter device according to the invention by means of further objective features.

Furthermore, the invention also relates to a motor vehicle with a counter device according to the invention or one of its embodiments. The counter device may additionally comprise as well a display device of the motor vehicle, on which the current count value can be displayed. The motor vehicle in this case is preferably designed as an electric vehicle or hybrid vehicle with an electric motor and has a high-voltage battery, for example, as the motor vehicle battery.

Moreover, the invention may also comprise a system from a motor vehicle and a device external to the vehicle, which is configured for implementing the method according to the invention or one of its embodiments. In this case, as previously described, particularly the calculation steps for calculating the estimated value can be carried out by the device external to the vehicle, and/or the provision of update information, as well as generally the collecting of battery data and parameters detected by other motor vehicles.

The invention also comprises the combinations of the features of the described embodiments.

BRIEF DESCRIPTION OF THE DRAWINGS

Exemplary embodiments of the invention are described in the following. The following is shown.

DETAILED DESCRIPTION

Figure 1:
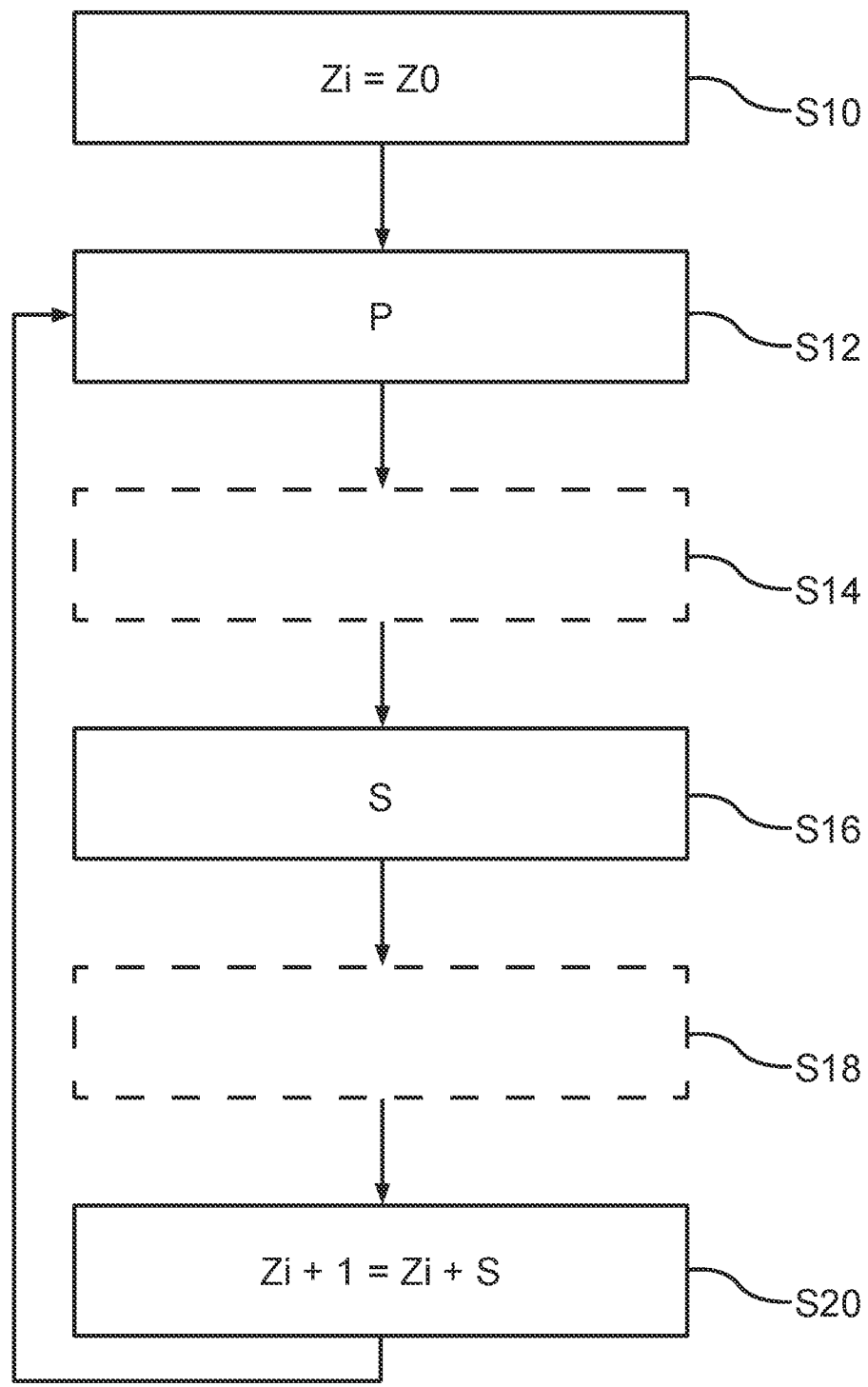
FIG. 1 a flowchart for explaining a method for ascertaining a count value for counting a previous effective service life of a motor vehicle battery according to an exemplary embodiment of the invention.

The exemplary embodiments explained in the following refer to preferred embodiments of the invention. With the exemplary embodiments, the described components of the embodiments represent individual features of the invention that are to be considered independently of one another, each of which also further develop the invention independently of one another and thus also are to be considered individually or in a combination that is different than the one shown as a component of the invention. Furthermore, the described embodiments can also be supplemented through further described features of the invention.

The same reference numerals refer to equivalent features and functions in the figures.

FIG. 1 shows a flowchart for explaining a method for providing a count value Z for counting a previous effective service life of a motor vehicle battery of a motor vehicle. The method starts in this case in step S10, in which, during a first commissioning of a motor vehicle battery which is particularly designed as a high-voltage battery, a starting count value Z0 is provided which is, for example, equal to zero. Furthermore, at least one parameter P influencing the effective service life of the motor vehicle battery is detected in step S12. Thus, the current battery temperature, for example, is detected, an ambient temperature, temperatures of other components of the motor vehicle or of the battery, the current state of charge of the battery, a current operating parameter, a load spectrum, a charging process, the charging capacity, and charging period, or the like. Based on this one or the several detected parameters P, an estimated value S is calculated, furthermore, in step S16, said estimated value estimating the influence of the one or the several detected parameters P on the effective service life of the motor vehicle battery. This calculation can take place, for example, in the motor vehicle itself or, for example, on a backend server as well. In the latter case, the input variables, i.e. the detected parameters P in step S14, are transferred from the motor vehicle to said server before the calculation in step S16. After the calculation in step S16, the estimated value S is then transferred to the motor vehicle in step S18. Finally, the starting count value Z0 is then increased to a current count value Z in step S20 on the basis of the calculated estimated value S. Or in general, the estimated value S is added to a count value Zi, which is current up to that point, and thereby a new current count value Zi+1 is provided. Subsequently, the method repeats itself starting from step S12. The parameters P influencing the service life and other influencing variables are thus continually detected and monitored and stored and evaluated in order to ascertain the estimated value S therefrom, on the basis of which the count value Z is then accordingly regularly and/or repeatedly increased.

The count value as well as each updated count value can then be accordingly shown on a display device in the motor vehicle. Thus, a significant indicator is advantageously provided of the use and/or the wear of an electrified vehicle. In order to make this indicator even more significant and/or more precise, information is used, which is provided by other vehicles with corresponding high-voltage batteries, which is then explained by means of FIG. 2.

Figure 2:
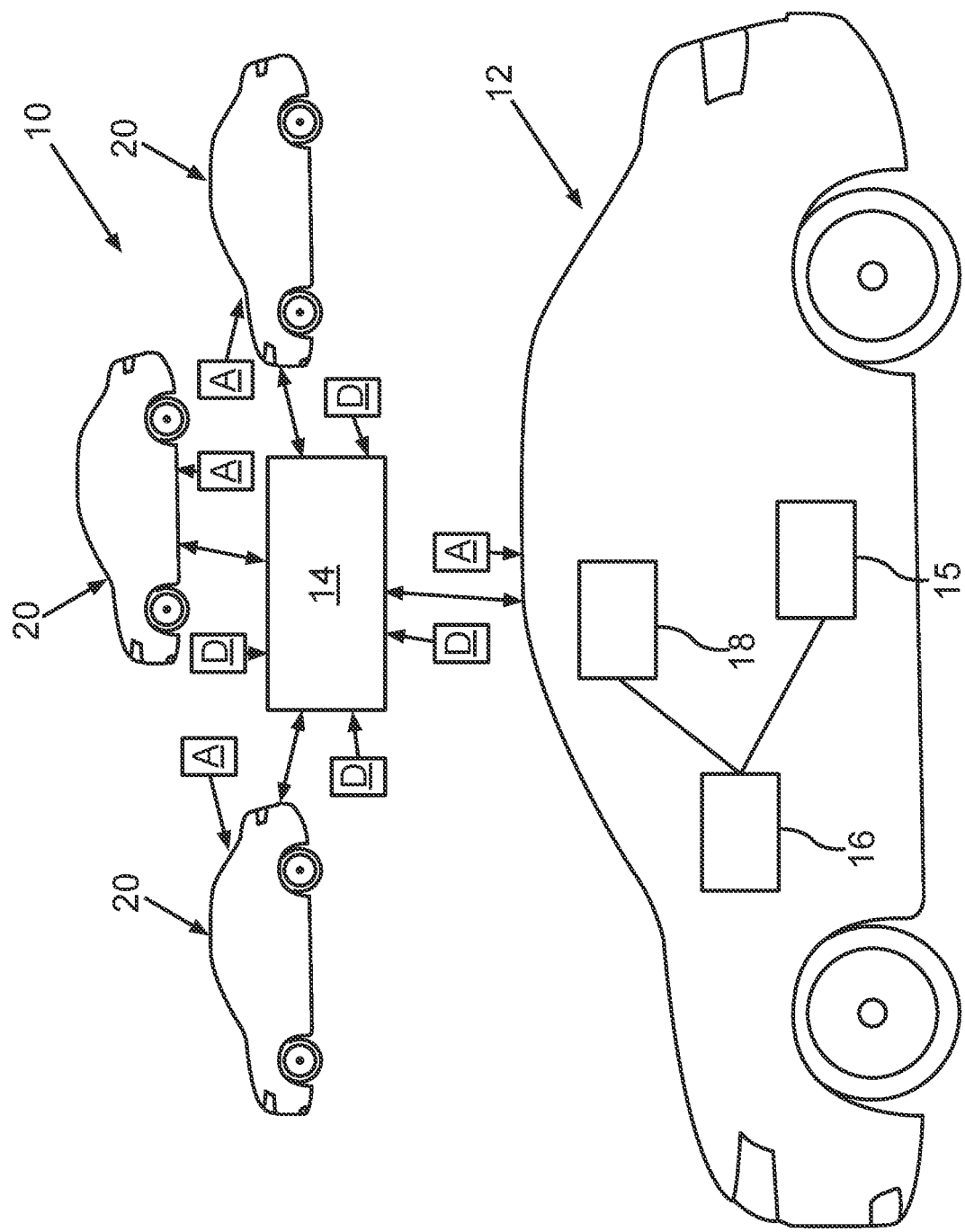
FIG. 2 a schematic representation of a system with a motor vehicle, a device external to the vehicle for providing a count value for counting the previous effective service life of a motor vehicle battery according to an exemplary embodiment of the invention.

FIG. 2 shows a schematic representation of a system 10 with a motor vehicle 12 and a central data processing device, which is formed as a backend server 14 according to an exemplary embodiment of the invention. The motor vehicle 12 has a high-voltage battery 15 and a control unit 16, which can take over, at least partially, the functionalities of a counter device, described as follows. In addition, the motor vehicle 12 also has a display device 18, on which the current count value Z can then be displayed. The motor vehicle 12 can particularly be designed to implement the method described in FIG. 1. Furthermore, the motor vehicle 12 is designed for wireless and/or wired communication with a device external to the vehicle. In this example, the motor vehicle 12 is formed with the backend server 14 for wireless communication, for example via radio communication. The influencing variables collected and detected by the motor vehicle 12, the current count value Z, as well as other battery parameters can be transferred to this server 14 via this communication. The data transferred to the server 14 are indicated by D here. Other motor vehicles 20, which likewise are formed as electrified motor vehicles 20 with a corresponding high-voltage battery, also transmit corresponding data D to the server 14. The server 14 collects this battery-related data D and evaluates the data, particularly with respect to which influencing variables more or less influence, in which manner, the service life of a particular motor vehicle battery of a particular motor vehicle. This type of obtained knowledge can then be transferred to the corresponding vehicle 12 and/or 20 for each individual vehicle 12 and/or 20 as a corresponding piece of update information A. The respective vehicles 12 and/or 20 can then advantageously adapt the calculation rule for calculating the estimated value S on the basis of this transmitted update information A. Subsequent to this, there is then a calculation of the estimated value S as well as an update of the count value Z, as described in FIG. 1 but with an updated calculation rule. As the number of motor vehicles increases and the time increases, the previous effective service life of a respective high-voltage battery 15 can also be described with increasing precision and applicability by means of this advantageous method and/or system 10.

As a whole, a user of an electrified vehicle can thus be provided a significant indicator of the wear of the motor vehicle by means of the invention.

The invention claimed is:

1. A method for ascertaining a variable relating to battery health, comprising:

ascertaining a count value by a counter device, the count value representing an effective service history of a motor vehicle battery of a first vehicle of a plurality of motor vehicles by using an increment counter which begins at zero, which has no upper limit, and which is configured to be increased in response to events which have an impact on a health and/or a degree of wear of the motor vehicle battery, establishing a starting count value of the count value, detecting at least one parameter which influences the health and/or the degree of wear of the motor vehicle battery, calculating, in the first vehicle, an estimated value for which the at least one parameter so detected influences the health and/or the degree of wear of the motor vehicle battery using a calculation rule, wherein the calculation rule comprises at least one of: a mathematical formula, a tabular assignment, a mathematical model, a characteristic curve, and a mathematical algorithm, and increasing the starting count value by the estimated value to a current count value, wherein one or more triggering events are defined which trigger a repeat of the steps of: establishing the starting count value, detecting the at least one parameter, calculating the estimated value, and increasing the starting count value, wherein the calculation rule is updateable based on at least one piece of update information, wherein the at least one piece of updateable information is derived by a device separate from the first vehicle based on at least an evaluation of data provided by a second vehicle of the plurality of motor vehicles, which differs from the first vehicle, and the update information so derived is then transmitted from the device separate from the first vehicle to the first vehicle to update the calculation rule in the first vehicle, and wherein the device separate from the first vehicle comprises a central processing device or communication infrastructure device.

2. The method according to claim 1, wherein the starting count value, the current count value, and each subsequent new current count value are displayed in time sequence on a display device of the first vehicle.

3. The method according to claim 1, wherein the at least one parameter represents at least one of the following:
   an ambient temperature;
   a motor vehicle battery temperature;
   an execution of a charging process in which the motor vehicle battery is charged;
   a charging capacity of the charging process;
   a charging period of the charging process;
   a current state of charge of the motor vehicle battery;
   an operating state of the first vehicle; and
   a current capacity demand placed on the motor vehicle battery.

4. The method according to claim 1, wherein the device separate from the first vehicle further derives the update information based on an evaluation of data provided by the first vehicle, and the device separate from the first vehicle then transmits the update information to a third vehicle of the plurality of motor vehicles, which is separate from the first and second vehicles, for updating a calculation rule in the third vehicle.

5. The method according to claim 2, wherein display of the starting count value, the current count value, and each subsequent new current count value are coupled directly to the first vehicle as a form of tamper protection.

6. The method according to claim 1, wherein one or more additional parameter values of the motor vehicle battery not currently used by the calculation rule are also stored with each increment of the count value so as to be available for subsequently updated calculation rules.

7. A counter device configured to:
   represent an effective service history of a motor vehicle battery of a first vehicle of a plurality of motor vehicles as a count value by using as an increment counter, wherein the increment counter begins at zero, has no upper limit, and is configured to be increased in response to events which have an impact on a health and/or a degree of wear of the motor vehicle battery,
   establish a starting count value of the count value,
   detect at least one parameter which influences the health and/or the degree of wear of effective service life of the motor vehicle battery,
   calculate, in the first vehicle, an estimated value for which the at least one parameter so detected influences the health and/or the degree of wear of effective service life of the motor vehicle battery using a calculation rule, wherein the calculation rule comprises at least one of: a mathematical formula, a tabular assignment, a mathematical model, a characteristic curve, and a mathematical algorithm, and
   increase the starting count value by the estimated value to a current count value,
   wherein one or more triggering events are defined which trigger the counter device to repeat: establishing the starting count value, detecting the at least one parameter, calculating the estimated value, and increasing the starting count value,
   wherein the calculation rule is updateable based on at least one piece of update information,
   wherein the at least one piece of update information is derived by a device separate from the first vehicle based on at least an evaluation of data provided by a second vehicle of the plurality of motor vehicles, which differs from the first vehicle, and the update information so derived is then transmitted from the device separate from the first vehicle to the first vehicle to update the calculation rule in the first vehicle, and
   wherein the device separate from the first vehicle comprises a central processing device or communication infrastructure device.

8. A motor vehicle comprising the counter device according to claim 7.

* * * * *